US010528261B2

(12) United States Patent
Baldwin et al.

(10) Patent No.: US 10,528,261 B2
(45) Date of Patent: Jan. 7, 2020

(54) OPTIMIZED PERFORMANCE THROUGH LEVERAGING APPROPRIATE DISK SECTORS FOR DEFRAGMENTATION IN AN ERASURE CODED HETEROGENEOUS OBJECT STORAGE CLOUD

(71) Applicant: INTERNATIONAL BUSINESS MACHINES CORPORATION, Armonk, NY (US)

(72) Inventors: Duane Baldwin, Mantorville, MN (US); Abhishek Dave, Pune (IN); Sasikanth Eda, Vijayawada (IN); Nataraj Nagaratnam, Cary, NC (US); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/829,517

(22) Filed: Dec. 1, 2017

(65) Prior Publication Data
US 2019/0171369 A1 Jun. 6, 2019

(51) Int. Cl.
G06F 3/06 (2006.01)
(52) U.S. Cl.
CPC .......... G06F 3/0608 (2013.01); G06F 3/064 (2013.01); G06F 3/0611 (2013.01); G06F 3/0676 (2013.01)
(58) Field of Classification Search
CPC ....... G06F 3/0608; G06F 3/064; G06F 3/0676
See application file for complete search history.

(56) References Cited

U.S. PATENT DOCUMENTS

| 6,779,081 B2 | 8/2004 | Arakawa et al. |
| 7,567,995 B2 | 7/2009 | Maynard et al. |
| 8,805,800 B2 | 8/2014 | Narasayya et al. |
| 8,825,980 B2 | 9/2014 | Patil et al. |

(Continued)

OTHER PUBLICATIONS

Mearian, "WD Leapfrogs Seagate with World's Highest Capacity 10TB Helium Drive, New Flash Drives", Computerworld, Sep. 9, 2014, 7 Pages, https://www.computerworld.com/article/2604311/computer-hardware/wd-leapfrogs-seagate-with-world-s-highest-capacity-10tb-helium-drive-new-flash-drives.html.

(Continued)

Primary Examiner — Edward J Dudek, Jr.
(74) Attorney, Agent, or Firm — Anthony M. Pallone

(57) ABSTRACT

An embodiment of the invention may include a method, computer program product and system for optimizing data defragmentation. The embodiment may include collecting details related to contiguous storage space available on a disk drive. The embodiment may include identifying a type of object storage implementation utilized on the disk drive. The type of object storage implementation is based on how an object is stored within the disk drive. The embodiment may include identifying an important component of the object. The important component of the object is determined by a frequency of access. The embodiment may include identifying a non-important component of the object. The non-important component of the object is determined by a frequency of access. The embodiment may include moving the important component to an outer sector of the disk drive. The embodiment may include moving the non-important component to an inner sector of the disk drive.

14 Claims, 5 Drawing Sheets

(56) References Cited

U.S. PATENT DOCUMENTS

| | | |
|---|---|---|
| 8,832,410 B2 | 9/2014 | Springberg |
| 9,430,168 B2 | 8/2016 | Abe |
| 2009/0113160 A1 | 4/2009 | Ferraro |
| 2012/0284474 A1 | 11/2012 | Lehr et al. |
| 2016/0357437 A1* | 12/2016 | Doerner .................. G06F 3/064 |
| 2017/0090758 A1 | 3/2017 | Balinski et al. |

OTHER PUBLICATIONS

HGST, "White Paper: Perpendicular Magnetic Recording Technology", Nov. 2007, 7 Pages, HGST, A Western Digital Company, https://www.hgst.com/sites/default/files/resources/PMR_white_paper_final.pdf.

HGST, "White Paper: Advanced Format Technology Brief", Mar. 2014, 7 Pages, HGST, A Western Digital Company, http://www.hgst.com/sites/default/files/resources/AFtechbrief.pdf.

Western Digital, "Perpendicular Magnetic Recording (PMR): WD Adresses Hard Drive Capacity Challenge with PMR Technology", Jul. 2006, 1 Page, Western Digital Technologies, Inc., Lake Forest, CA.

Mell et al., "The NIST Definition of Cloud Computing", NIST, Sep. 2011, 7 Pages, Special Publication 800-145, U.S. Department of Commerce, Gaithersburg, MD.

IBM: List of IBM Patents or Patent Applications Treated As Related (Appendix P), Aug. 21, 2019, 2 pages.

Pending U.S. Appl. No. 16/546,816, filed Aug. 21, 2019, entitled: "Optimized Performance Through Leveraging Appropriate Disk Sectors for Defragmentation in an Erasure Coded Heterogeneous Object Storage Cloud", 30 pages.

\* cited by examiner

OPTIMIZED PERFORMANCE THROUGH LEVERAGING APPROPRIATE DISK SECTORS FOR DEFRAGMENTATION IN AN ERASURE CODED HETEROGENEOUS OBJECT STORAGE CLOUD

BACKGROUND

The present invention relates, generally, to the field of data management, and more specifically, to data defragmentation in an erasure coded heterogeneous object storage cloud.

In computer storage, fragmentation may occur when storage space is used inefficiently, reducing storage capacity or system performance and often both. The exact consequences of fragmentation depend on the specific system of storage allocation in use and the particular form of fragmentation. Data fragmentation occurs when a collection of data in storage space is broken up into many pieces that are not close together.

BRIEF SUMMARY

An embodiment of the invention may include a method, computer program product and system for optimizing data defragmentation. The embodiment may include collecting details related to contiguous storage space available on a disk drive. The embodiment may include identifying a type of object storage implementation utilized on the disk drive. The type of object storage implementation is based on how an object is stored within the disk drive. The embodiment may include identifying an important component of the object. The important component of the object is determined by a frequency of access. The embodiment may include identifying a non-important component of the object. The non-important component of the object is determined by a frequency of access. The embodiment may include moving the important component of the object to an outer sector of the disk drive. The embodiment may include moving the non-important component of the object to an inner sector of the disk drive.

DETAILED DESCRIPTION

Figure 1:
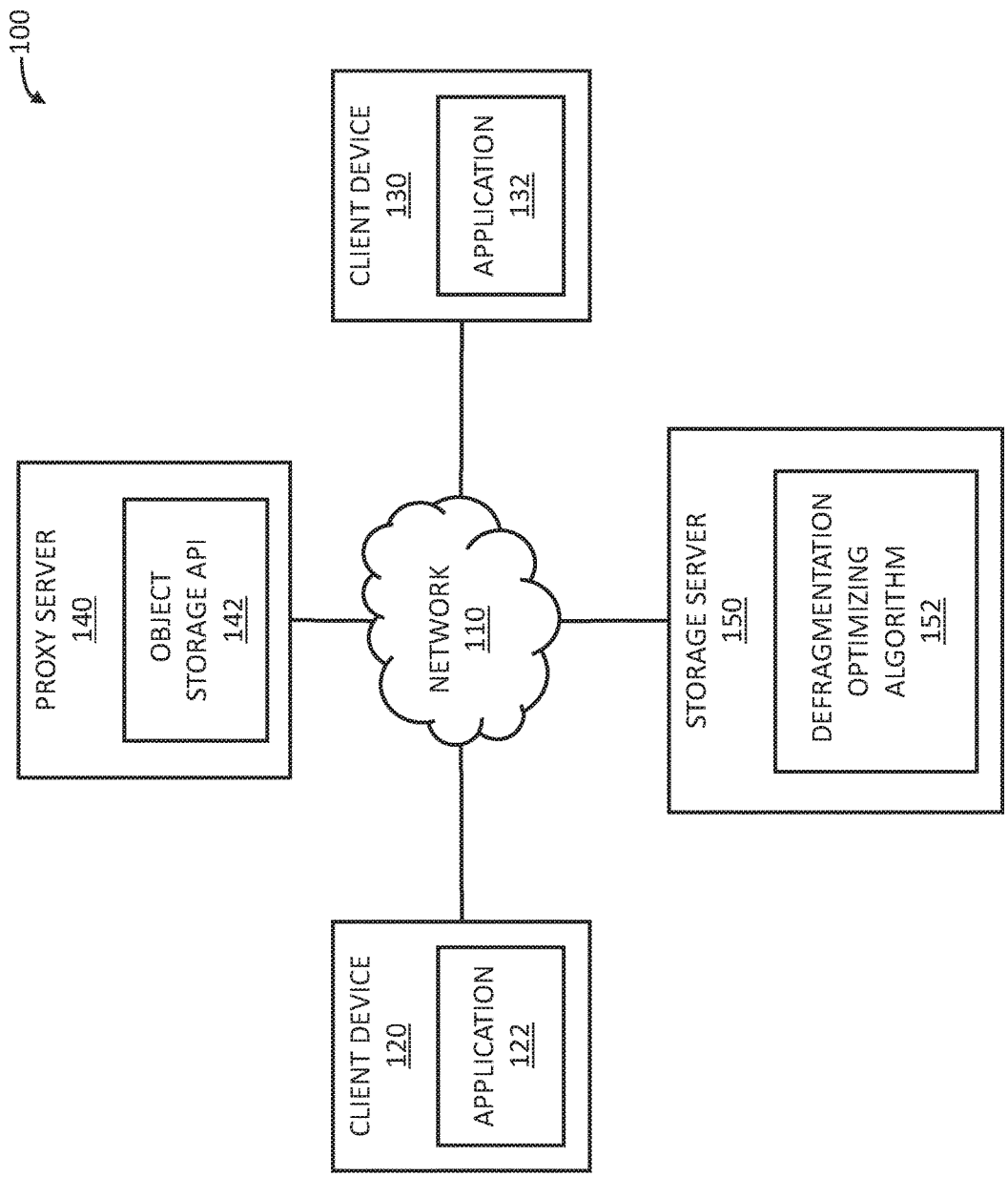
FIG. 1 is a block diagram illustrating a data defragmentation optimizing system, in accordance with an embodiment of the present invention.

Erasure coding ("EC") is a method of data protection in which data is broken into fragments, expanded and encoded with redundant data pieces and stored across a set of different locations or storage media. Erasure coding enables reconstruction of data that has become corrupted at some point in the disk storage process by using remotely stored information about the data. Erasure coding can be useful with large quantities of data and applications or systems that need to tolerate failures, such as disk array systems, data grids, distributed storage applications, and object stores. Erasure coding is commonly used in implementations of object-based cloud storage.

An erasure code supported object storage architecture may be depicted by two node groups. One node group, labeled as proxy nodes, may be used for distributed load handling (sending requests into a namespace), and another node group, labeled as storage nodes, may be responsible for writing into the disks/storage subsystems. Such an object storage architecture implementation may purely serve as a storage repository. In this kind of architecture, a user uploaded data object may be split into data segments and each segment may be encoded using an erasure code schema which results in multiple data, parity fragments. Each fragment may be written to a single storage node which may result in distribution of erasure codes of a single data object across all storage nodes.

Data defragmentation is the process of consolidating fragmented data on a volume (such as a hard disk or a storage device) so it may be accessed more efficiently. Fragmentation happens to a volume over time as users save, change, or delete files. The changes that a user may save to a file are often stored in a different place on the volume than the original file. Over time, both the file and the volume itself become fragmented, and file access performance of a computing device may slow down as it has to look in different places to open a single file. Data Defragmentation can be defined as a technique that rearranges the data on your volume and reunites fragmented data so a computing device may access data efficiently.

In an example embodiment of disk storage, a sector is a subdivision of a track on a magnetic disk. Each sector stores a fixed amount of user accessible data. In the embodiment, a hard disk drive platter is the circular disk on which magnetic data is stored in a hard disk drive. Hard drives typically have several platters which are mounted on the same spindle. A platter can store information on both sides, requiring two heads per platter. Typically, a platter will have a faster outer partition and a slower inner partition. As a result of improved reliability and continued research furthering storage capacity increase per floor space (increase in disk density), the speed gap between the partitions has grown significantly (100/60 speed gap ratio between outer partitions vs. inner partitions). Many storage vendors and solution providers have started leveraging this speed gap to facilitate efficient storage management. Current day disk defragmentation algorithms are built on effective space optimization and minimize data movement using principles such as best fit, worst fit, next fit, etc., which primarily checks for the largest contiguous space available on the disk and rearranges the data blocks with minimum rotation.

However, the current day defragmentation algorithms do not identify the speed variation between inner and outer partitions based on the disk type, and lack intelligence to identify the most accessed bytes/portion of a data object and its corresponding metadata (e.g., first 10 bytes used for preview generation, or last bytes used for checksum comparison, durability factors). These deficiencies leave room for improvement in defragmentation algorithm utilization in an erasure coded object storage environment.

For example, there may exist a situation where a proprietary erasure code supported object storage architecture stores object or EC fragments and metadata separately under different file directory hierarchies. In this situation, the traditional defragmentation algorithm checks for the largest contiguous space and moves the fragmented fixed content/data and metadata blocks to the identified contiguous space, regardless of whether the identified contiguous space is an inner partition or an outer partition. In that event, the traditional defragmentation algorithm lacks intelligence to understand/predict if data or metadata, or both, are accessed frequently and therefore determine which part of the data (e.g., frequently accessed data, metadata, or both) should be moved to identified contiguous space across outer partitions and which part of the data (e.g., less frequently accessed data, metadata, or both) should be moved to identified contiguous space across inner partitions.

In another example, there may exist a situation where a different proprietary erasure code supported object storage architecture stores object or EC fragment and metadata in sequential blocks. In this situation, the traditional defragmentation algorithm checks for the largest contiguous space and moves the fragmented fixed content/data and metadata blocks to the identified contiguous spaces, regardless of whether the identified contiguous space is an inner partition or an outer partition. As such, the traditional defragmentation algorithm lacks intelligence to identify/predict if data or metadata, or both of them, are accessed frequently and therefore determine which part of the data (e.g., frequently accessed fragmented fixed content/data, metadata blocks, or both) should be moved to identified contiguous space across outer partitions and which part of the data (e.g., less frequently accessed fragmented fixed content/data, metadata blocks, or both) should be moved to identified contiguous space across inner partitions.

In yet another example, there may exist an open source erasure code supported object storage architecture which stores an erasure code fragment and its corresponding durability file (A durable file contains data such as md5 sum (128-bit hash) of the fragments, fragment index, etc.) of an object per node. In this situation, the traditional defragmentation algorithm checks for largest contiguous space and moves the fragmented fixed content/data and corresponding durability file blocks to the identified contiguous spaces, regardless of whether the identified contiguous space is an inner partition or an outer partition. Consequently, the traditional defragmentation algorithm lacks intelligence to understand/predict if the fragmented fixed content/data or durability file, or both of them, are accessed frequently and therefore determine which part of the data (e.g., frequently accessed fragmented fixed content/data, or durability file, or both) should be moved to identified contiguous space across outer partitions and which part of the data (e.g., less frequently accessed fragmented fixed content/data, or durability file, or both) should be moved to identified contiguous space across inner partitions.

Embodiments of the present invention may include an efficient disk defragmentation algorithm in an erasure coded object storage environment (e.g., a heterogeneous cloud infrastructure) which selects the appropriate disk sector (inner vs. outer) for rearranging the EC fragment data blocks per node. The proposed invention may enable a framework which collects details relating to availability of continuous free space along with number of blocks, block size, and track/sector location information per node participating in the erasure code policy. Moreover, based on the obtained track/sector details, a sector may be further classified as inner or outer. Below is an example of the details collected by the proposed framework.

```
{
    "node-1": {
        "block_size": "255",
        "no_of_continous_blocks": "15",
        "sector_details": "xx001-xx022"
        "sector_classification": "INNER"
    },
    "node-2": {
        "block_size": "125",
        "no_of_continous_blocks": "10",
        "sector_details": "xx22008-xx40009"
        "sector_classification": "OUTER"
    },
    "node-3": {
        "block_size": "255",
        "no_of_continous_blocks": "18",
        "sector_details": "xx100-xx200"
        "sector_classification": "INNER"
    }
}
```

The proposed invention may provide an algorithm which identifies/learns the erasure code supported object storage architecture (i.e., classifies the object storage implementation based on the way objects are stored to determine whether object and metadata are stored separately, object and metadata are stored together, or object along with its durability file are stored together) along with the end user application usage and workload pattern, in order to accordingly identify the important component per object (e.g., object fixed data, metadata, durability file, etc.). Below is an example of details identified by the proposed algorithm per object.

```
"incoming_object": {
    "name": "Obj1",
    "ec_implementation": "ObjectAndDurable",
    "important_component": "DurableFile"
}
```

Based on the above collected details related to continuous free space, sector classification, and identified important component per object, the proposed defragmentation algorithm may move the important component of object to the appropriate sector (i.e. mostly frequently accessed component of object is moved to outer partition). For example, if an object storage implementation is identified as object and metadata stored separately under different file directory hierarchies, and the important component of a particular object is identified as metadata, the proposed defragmentation algorithm will move/arrange the metadata blocks to free contiguous space identified in the outer sectors. In another example, if an object storage implementation is identified as object and metadata stored separately under different file directory hierarchies, and the important component of a particular object is identified as fixed object data, the proposed defragmentation algorithm will move/arrange the identified important component (i.e., the fixed object data blocks) to free contiguous space identified in the outer sectors. In yet another example, if an object storage implementation is identified as object and metadata stored together and the important component of a particular object is identified as metadata, the proposed defragmentation algorithm will move/arrange the identified important component (i.e., the metadata blocks) to free contiguous space identified in the outer sectors. Finally, in an example where an object storage implementation is identified as object and durable file stored together, and the important component of a particular object is identified as the durable file, the proposed defragmentation algorithm will move/arrange the identified important component (i.e., the durable file blocks) to free contiguous space identified in the outer sectors.

Embodiments of the present invention will now be described in detail with reference to the accompanying Figures.

FIG. 1 is a functional block diagram illustrating data defragmentation optimizing ("DDO") system 100, in accordance with an embodiment of the present invention. In an example embodiment, data defragmentation optimizing system 100 may include client device 120, client device 130, proxy server 140, and storage server 150, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between client device 120, client device 130, proxy server 140, and storage server 150.

In an example embodiment, client device 120 may include application 122. Client device 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as client device 130 and proxy server 140, via network 110, and capable of supporting the functionality required of embodiments of the invention. While client device 120 is shown as a single device, in other embodiments, client device 120 may be comprised of a cluster or plurality of computing devices, working together or working separately. Client device 120 may be described generally with respect to FIG. 3 below.

In an example embodiment, application 122 may be a program, or subroutine contained in a program, that may operate to access data centrally stored within storage server 150. Application 122 may result from any commercially available, open source, or proprietary software that access a remote storage device to retrieve and store data, in accordance with embodiments of the invention. In an example embodiment, application 122 may communicate, via network 110, with proxy server 140 in order to access data stored within storage server 150.

In an example embodiment, client device 130 may include application 132. Client device 130 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as client device 120 and proxy server 140, via network 110, and capable of supporting the functionality required of embodiments of the invention. While client device 130 is shown as a single device, in other embodiments, client device 130 may be comprised of a cluster or plurality of computing devices, working together or working separately. Client device 130 may be described generally with respect to FIG. 3 below.

In an example embodiment, application 132 may be a program, or subroutine contained in a program, that may operate to access data centrally stored within storage server 150. Application 132 may result from any commercially available, open source, or proprietary software that access a remote storage device to retrieve and store data, in accordance with embodiments of the invention. In an example embodiment, application 132 may communicate, via network 110, with proxy server 140 in order to access data stored within storage server 150.

In an example embodiment, proxy server 140 may include object storage API 142. Proxy server 140 may be a desktop computer, a notebook, a laptop computer, a blade server, a networked computer appliance, a virtual device, a thin client, or any other networked electronic device or computing system capable of receiving and sending data from and to other computing devices such as client device 120, client device 130, and storage server 150, via network 110, and capable of supporting the functionality required of embodiments of the invention. While proxy server 140 is shown as a single device, in other embodiments, proxy server 140 may be comprised of a cluster or plurality of computing devices, working together or working separately. Proxy server 140 may be described generally with respect to FIG. 3 below.

In an example embodiment, object storage API 142 may be a program, or subroutine contained in a program, that may operate to create, modify, or otherwise access objects and metadata stored within storage server 150. In an example embodiment, object storage API 142 may be implemented as a set of Representational State Transfer ("REST") web services. Furthermore, object storage API 142 may handle requests, received from a client device (e.g., client device 120, client device 130) via the HTTPS (SSL) protocol, to access centrally stored data objects, via network 110. In an example embodiment, object storage API 142 receives a request, from application 122, to access data stored within storage server 150. In another embodiment, an instance of object storage API 142 may be located on storage server 150.

In an example embodiment, storage server 150 may include defragmentation optimizing algorithm 152. Storage server 150 may be a desktop computer, a notebook, a laptop computer, a blade server, a networked computer appliance, a virtual device, a thin client, or any other networked electronic device or computing system capable of storing object data and corresponding metadata, capable of receiving and sending data from and to other computing devices such as proxy server 140, via network 110, and capable of supporting the functionality required of embodiments of the invention. In an example embodiment, storage server 150 may store and organize object data and corresponding metadata on magnetic disks. While storage server 150 is shown as a single device, in other embodiments, storage server 150 may be comprised of a cluster or plurality of computing devices, working together or working separately. Storage server 150 may be described generally with respect to FIG. 3 below.

In an example embodiment, defragmentation optimizing algorithm 152 may be a program, or subroutine contained in a program, that may operate to optimize defragmentation of object data in an erasure code supported object storage environment. Defragmentation optimizing algorithm 152 may leverage appropriate disk sectors (i.e., outer vs. inner) for defragmentation of data stored within storage server 150.

In an example embodiment, defragmentation optimizing algorithm 152 may collect details relating to availability of continuous free space along with number of blocks, block size, and track/sector location information and may further classify a sector as inner or outer tracks. Defragmentation optimizing algorithm 152 may also identify the erasure code supported object storage architecture and the important component per object (e.g., object fixed data, metadata, durability file, etc.). Furthermore, defragmentation optimizing algorithm 152 may move the important component of object to the appropriate sector. The operations and functions of defragmentation optimizing algorithm 152 are described in further detail below with regard to FIG. 2.

Figure 2:
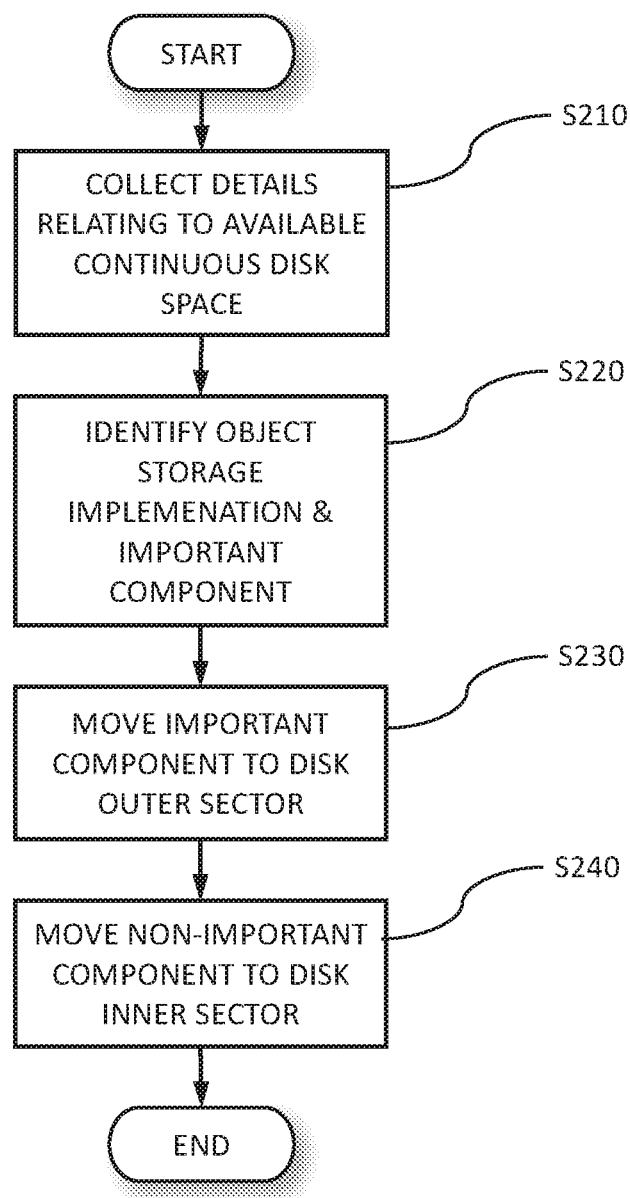
FIG. 2 is a flowchart illustrating the operations of the defragmentation optimizing algorithm of FIG. 1, in accordance with an embodiment of the invention.

FIG. 2 shows a flowchart illustrating the operations of defragmentation optimizing algorithm 152 in accordance with an example embodiment of the invention. Referring to step S210, defragmentation optimizing algorithm 152 may collect system details relating to contiguous free disk space available on a given disk within a storage device (e.g., storage server 150). The details may contain disk information on block size, number of continuous blocks, sector details, and sector classification (i.e., inner sector or outer sector). In an example embodiment, defragmentation optimizing algorithm 152 collects details on contiguous disk space available within storage server 150.

Referring to step S220, defragmentation optimizing algorithm 152 may identify a type of object storage implementation/architecture utilized on a storage device (e.g., storage server 150). In identifying the type object storage implementation, defragmentation optimizing algorithm 152 determines whether object data and its corresponding metadata, or supportive file (e.g., durable file), is stored together or separately. Object storage implementation type is based on how objects are stored. Furthermore, in step S230, defragmentation optimizing algorithm 152 may observe an end user's application usage (e.g., usage of application 122) and workload patterns in order to identify the important component of the data object (i.e., either the object's fixed data, the object's metadata, or the object's durable file). Defragmentation optimizing algorithm 152 may identify the most frequently accessed component of a data object as the important component. The less frequently accessed component may be identified as the non-important component. In an example embodiment, defragmentation optimizing algorithm 152 identifies the type of object storage implementation utilized within storage server 150 based on how data objects are stored within storage server 150. Moreover, in an example embodiment, defragmentation optimizing algorithm 152, identifies the important component of the data object stored within storage server 150 based on the frequency of component access.

Referring to step S230, defragmentation optimizing algorithm 152 may move the important component of a data object, identified in step S220, to free contiguous space within the outer sector of the disk for which details were collected in step S210. The entirety of the identified important component is migrated to contiguous space within the outer sector of the disk. For example, in an instance where the metadata file is identified as the important component, the entire metadata file is consolidated and migrated to the outer track if the outer track contains contiguous space sufficient to fit the entire metadata file.

Referring to step S240, defragmentation optimizing algorithm 152 may move the non-important component of a data object, identified in step S220, to free contiguous space within the inner sector of the disk for which details were collected in step S210.

Figure 3:
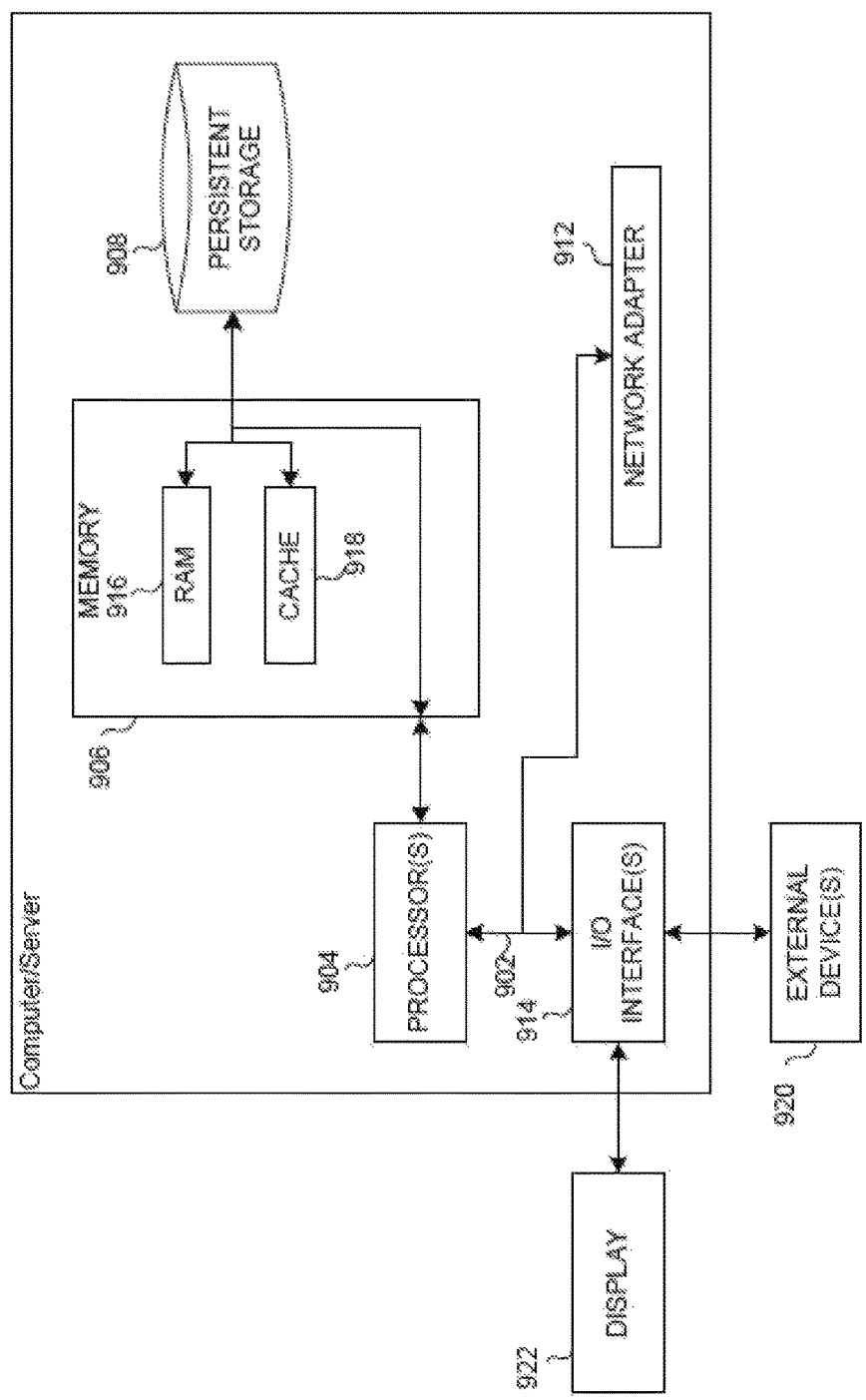
FIG. 3 is a block diagram depicting the hardware components of the data defragmentation optimizing system of FIG. 1, in accordance with an embodiment of the invention.

FIG. 3 depicts a block diagram of components of client device 120, client device 130, proxy server 140, and storage server 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client device 120, client device 130, proxy server 140, and storage server 150 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs application 122 in client device 120; application 132 in client device 130; object storage API in proxy server 140; and defragmentation optimizing algorithm 152 in storage server 150 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs application 122 in client device 120; application 132 in client device 130; object storage API in proxy server 140; and defragmentation optimizing algorithm 152 in storage server 150 may be downloaded to persistent storage 908 through network adapter 912.

I/O interface(s) 914 allows for input and output of data with other devices that may be connected to client device 120, client device 130, proxy server 140, and storage server 150. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs application 122 in client device 120; application 132 in client device 130; object storage API in proxy server 140; and defragmentation optimizing algorithm 152 in storage server 150, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
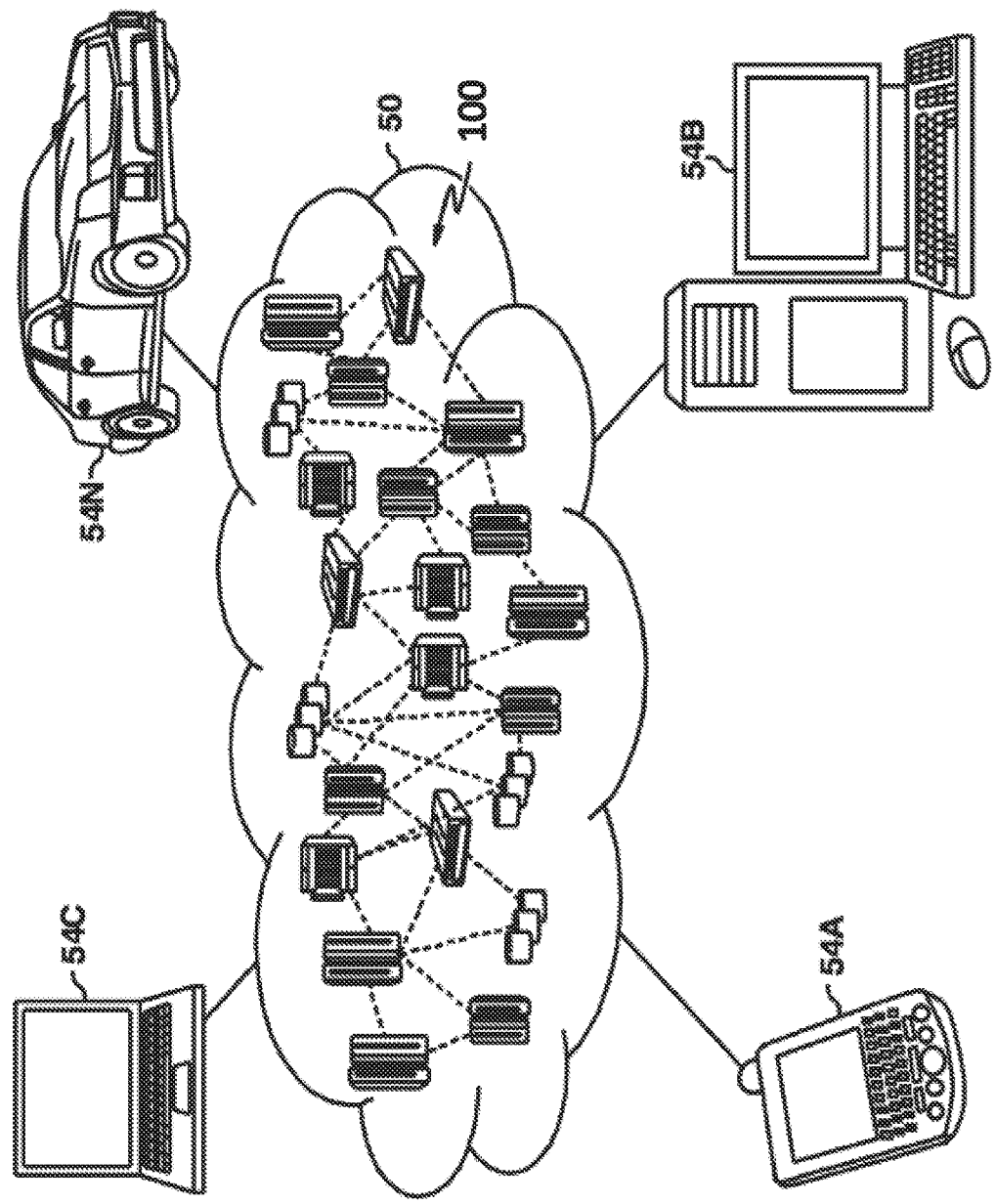
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
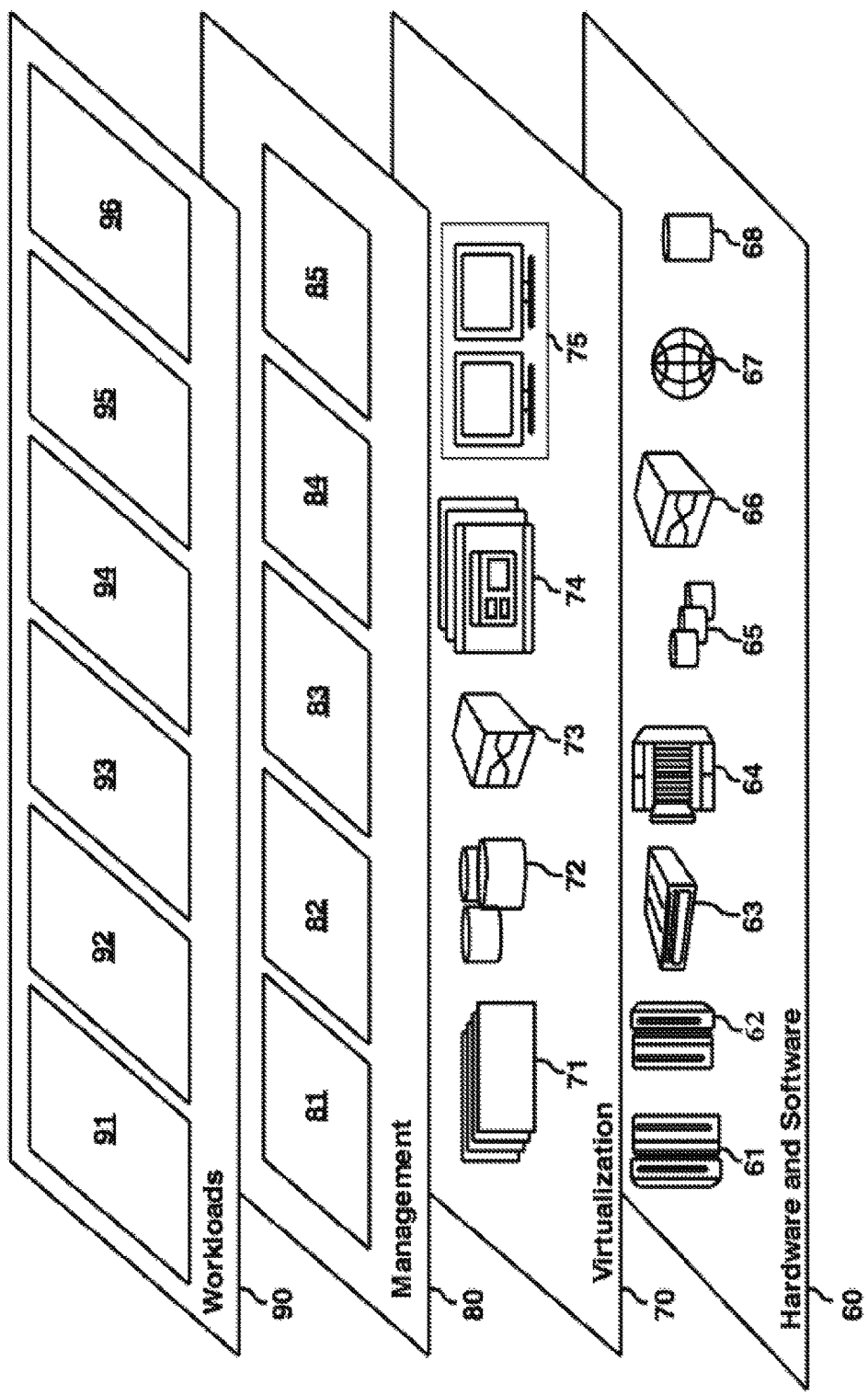
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data defragmentation optimizing system 96. Data defragmentation optimizing system 96 may relate to optimizing data defragmentation in an erasure coded heterogeneous object storage cloud.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for optimizing data defragmentation, the method comprising:
    collecting details related to contiguous storage space available on a disk drive,
    identifying a type of object storage implementation utilized on the disk drive, wherein the type of object storage implementation is based on how an object is stored within the disk drive, and wherein identifying the type of object storage implementation utilized on the disk drive comprises determining whether the object is stored together with, or separately, from an element selected from the group consisting of metadata corresponding to the object and a durability file corresponding to the object, and wherein the durability file corresponding to the object comprises a hash value for the object and is used to verify integrity of the object;
    identifying an important component of the object, wherein the important component of the object is determined by a frequency of access of the important component;
    identifying a non-important component of the object, wherein the non-important component of the object is determined by a frequency of access of the non-important component;
    moving the important component of the object to an outer sector of the disk drive, wherein the outer sector of the disk drive comprises available contiguous space sufficient to store the important component in its entirety; and
    moving the non-important component of the object to an inner sector of the disk drive.

2. The method of claim 1, wherein identifying the important component of the object comprises determining a most frequently accessed component of the object, and wherein the determined most frequently accessed component of the object is identified as the important component of the object.

3. The method of claim 1, wherein identifying the non-important component of the object comprises determining a least frequently accessed component of the object, and wherein the determined least frequently accessed component of the object is identified as the non-important component of the object.

4. The method of claim 1, wherein the important component of the object is selected from the group consisting of fixed data associated with the object, metadata associated with the object, and a durability file associated with the object.

5. The method of claim 1, wherein the details related to contiguous storage space available on a disk drive comprise an element selected from the group consisting of disk information on block size, a number of contiguous blocks, sector details, an inner sector classification, and outer sector classification.

6. A computer program product for optimizing data defragmentation, the computer program product comprising:
    one or more computer-readable tangible storage devices and program instructions stored on at least one of the one or more computer-readable tangible storage devices, the program instructions comprising:
    program instructions to collect details related to contiguous storage space available on a disk drive;
    program instructions to identify a type of object storage implementation utilized on the disk drive, wherein the type of object storage implementation is based on how an object is stored within the disk drive, and wherein program instructions to identify the type of object storage implementation utilized on the disk drive comprises program instructions to determine whether the object is stored together with, or separately, from an element selected from the group consisting of metadata corresponding to the object and a durability file corresponding to the object, and wherein the durability file corresponding to the object comprises a hash value for the object and is used to verify integrity of the object;
program instructions to identify an important component of the object, wherein the important component of the object is determined by a frequency of access of the important component;
program instructions to identify a non-important component of the object, wherein the non-important component of the object is determined by a frequency of access of the non-important component;
program instructions to move the important component of the object to an outer sector of the disk drive, wherein the outer sector of the disk drive comprises available contiguous space sufficient to store the important component in its entirety; and
program instructions to move the non-important component of the object to an inner sector of the disk drive.

7. The computer program product of claim 6, wherein program instructions to identify the important component of the object comprises program instructions to determine a most frequently accessed component of the object, and wherein the determined most frequently accessed component of the object is identified as the important component of the object.

8. The computer program product of claim 6, wherein program instructions to identify the non-important component of the object comprises program instructions to determine a least frequently accessed component of the object, and wherein the determined least frequently accessed component of the object is identified as the non-important component of the object.

9. The computer program product of claim 6, wherein the important component of the object is selected from the group consisting of fixed data associated with the object, metadata associated with the object, and a durability file associated with the object.

10. The computer program product of claim 6, wherein the details related to contiguous storage space available on a disk drive comprise an element selected from the group consisting of disk information on block size, a number of contiguous blocks, sector details, an inner sector classification, and outer sector classification.

11. A computer system for optimizing data defragmentation, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to collect details related to contiguous storage space available on a disk drive;
program instructions to identify a type of object storage implementation utilized on the disk drive, wherein the type of object storage implementation is based on how an object is stored within the disk drive, and wherein program instructions to identify the type of object storage implementation utilized on the disk drive comprises program instructions to determine whether the object is stored together with, or separately, from an element selected from the group consisting of metadata corresponding to the object and a durability file corresponding to the object, and wherein the durability file corresponding to the object comprises a hash value for the object and is used to verify the integrity of the object;
program instructions to identify an important component of the object, wherein the important component of the object is determined by a frequency of access of the important component;
program instructions to identify a non-important component of the object, wherein the non-important component of the object is determined by a frequency of access of the non-important component;
program instructions to move the important component of the object to an outer sector of the disk drive, wherein the outer sector of the disk drive comprises available contiguous space sufficient to store the important component in its entirety; and
program instructions to move the non-important component of the object to an inner sector of the disk drive.

12. The computer system of claim 11, wherein program instructions to identify the important component of the object comprises program instructions to determine a most frequently accessed component of the object, and wherein the determined most frequently accessed component of the object is identified as the important component of the object.

13. The computer system of claim 11, wherein program instructions to identify the non-important component of the object comprises program instructions to determine a least frequently accessed component of the object, and wherein the determined least frequently accessed component of the object is identified as the non-important component of the object.

14. The computer system of claim 11, wherein the important component of the object is selected from the group consisting of fixed data associated with the object, metadata associated with the object, and a durability file associated with the object.

* * * * *